United States Patent
Carr et al.

[19]

[11] Patent Number: 6,140,793
[45] Date of Patent: Oct. 31, 2000

[54] STEPPER MOTOR CONTROLLER FOR MICROSTEPPING A STEPPER MOTOR AND A METHOD FOR MICROSTEPPING A STEPPER MOTOR

[75] Inventors: Raymond A. Carr, Lutz; Michael R. Johns, Largo, both of Fla.

[73] Assignee: Bristol-Myers Squibb Company, New York, N.Y.

[21] Appl. No.: 09/377,030

[22] Filed: Aug. 19, 1999

[51] Int. Cl.[7] ........................................... H02P 8/00
[52] U.S. Cl. .................... 318/696; 318/685; 318/603; 318/607
[58] Field of Search ................... 318/696, 685, 318/603, 607

[56] References Cited

U.S. PATENT DOCUMENTS

| | | | |
|---|---|---|---|
| 4,091,316 | 5/1978 | Friedman | 318/696 |
| 4,359,751 | 11/1982 | Goldschmidt et al. | 346/136 |
| 4,446,412 | 5/1984 | Friedman et al. | 318/696 |
| 4,584,512 | 4/1986 | Pritchard | 318/696 |
| 4,618,808 | 10/1986 | Ish-Shalom et al. | 318/696 |
| 4,703,243 | 10/1987 | Ettelman et al. | 318/696 |
| 4,710,691 | 12/1987 | Bergstrom et al. | 319/696 |
| 4,782,404 | 11/1988 | Baba | 360/77 |
| 4,855,660 | 8/1989 | Wright et al. | 318/696 |
| 4,929,879 | 5/1990 | Wright et al. | 318/696 |
| 5,117,171 | 5/1992 | Bonss | 318/696 |
| 5,198,741 | 3/1993 | Shinada et al. | 318/696 |
| 5,225,756 | 7/1993 | Coutu | 318/696 |
| 5,359,271 | 10/1994 | Husher | 318/696 |
| 5,378,975 | 1/1995 | Schweid et al. | 318/685 |
| 5,424,960 | 6/1995 | Watanabe et al. | 364/506 |
| 5,574,351 | 11/1996 | Jacobson et al. | 318/696 |
| 5,659,234 | 8/1997 | Cresens | 318/696 |
| 5,783,939 | 7/1998 | Lippmann et al. | 324/154 |
| 5,847,535 | 4/1986 | Nordquist et al. | 318/700 |
| 5,914,580 | 6/1999 | Senoh | 318/696 |
| 6,040,676 | 3/2000 | Nordquist et al. | 318/696 |

*Primary Examiner*—David Martin
*Assistant Examiner*—Rita Leykin
*Attorney, Agent, or Firm*—Theodore R. Furman, Jr.; John M. Kilcoyne; Stuart E. Krieger

[57] ABSTRACT

A low overhead controller for microstepping a stepper motor and a low overhead method for microstepping a stepper motor. The reduction in overhead in system processor is accomplished by the control circuit which dynamically interpolates motor positions between steps commanded from the processor. Also, the reduction in overhead is accomplished by a microstepping method used to effect microstepping resolution control by employing a stored look-up table which gives a resolution value at a given speed according to a predetermined function.

12 Claims, 11 Drawing Sheets

STEPPER MOTOR CONTROLLER FOR MICROSTEPPING A STEPPER MOTOR AND A METHOD FOR MICROSTEPPING A STEPPER MOTOR

1. FIELD OF THE INVENTION

The present invention is in the field of stepper motors and, in particular, provides a low overhead controller for microstepping a stepper motor and a low overhead method for microstepping a stepper motor.

2. BACKGROUND

Stepper motors have significant advantages for systems which require low cost motion control with precise mechanical placement. One disadvantage to using stepper motors in control applications is their characteristic resonance generated by overshoot and recovery due to step size and positional velocity. A common method for overcoming this problem is to "microstep" the motor. Microstepping reduces resonance by decreasing the distance traveled by the rotor between each step. A negative aspect of microstepping is the increased overhead associated with generating pulse trains from the system control circuit to the microstepping controller. Various techniques have been developed for microstepping the stepper motors. For example, U.S. Pat. No. 4,446,412 to Friedman et al. discloses a method and apparatus for damping the natural resonance of a stepper motor by microstepping such that the command currents for driving the stepper motor are developed from a velocity feedback signal which is derived from a tachometer and a digital position signal from a step rate generator. Friedman et al. also provides command currents for driving a stepper motor which are developed from a digitally processed velocity error signal and a digital feed forward acceleration signal. However, while addressing the problem of resonance experienced by the stepper motors, like other known methods, Friedman et al. does so at the expense of large overhead associated with generating pulse trains from the system control circuit to the microstepping controller.

On the other hand, U.S. Pat. No. 4,929,879 to Wright et al., discloses a method for micro-stepping a unipolar stepping motor by utilizing a look-up table containing stored values of SINE and COSINE of given angles. In particular, after present position and desired position of a stepper motor are computed, a certain number of micro-steps (e.g. 4, 8, 16, or 32) per motor step are chosen depending on the position accuracy one wishes to achieve. Accordingly, Wright discloses that in order to insure the stopping accuracy of the stepper motor, the resolution of micro-steps (i.e., the rate of micro-stepping) as the motor's current position approaches the desired position must be increased. However, while reducing the overhead associated with generating pulses for microstepping the stepper motor by utilizing a look up table, Wright et al. limits the accuracy of the stepper motor to the values stored in the look up table. Thus, the control system proposed by Wright et al. cannot account for various degrees of microstepping that may be required for precision control of the stepper motor. Accordingly, when the look up table does not provide sufficient accuracy, the stepper motor utilizing the Wright et al microstepping method will suffer same problem as a stepper motor which is not microstepped i.e., the characteristic resonance generated by overshot and recovery due to step size and positional velocity.

3. SUMMARY OF THE INVENTION

One aspect of the invention provides a stepper motor control circuit which reduces overhead in an overall system processor by reducing the amount of processing capacity required in issuing control commands when microstepping is used to reduce resonance in the motor. The reduction in overhead in the system processor is accomplished by the control circuit which dynamically interpolates motor positions between steps commanded from the processor, thus allowing greater step resolution without increasing the commands issued from the processor.

Another aspect of the invention is a method for reducing the overhead in a system processor which is controlling a stepper motor being driven sinusoidally and which is being microstepped to control resonance in the motor. Specifically, the resolution of the microsteps is varied as the speed of the motor changes. At lower speeds, the resolution can be increased so that a sinusoidal wave can be more accurately approximated to drive the motor, without increase in processor overhead. On the other hand, at higher speeds, the resolution is lowered so that additional processor overhead is not used to approximate the sinusoidal wave. The method used to effect this resolution control employs, for example, a stored look-up table which gives a resolution value at a given speed according to a predetermined function. Accordingly, precise microstepping control is achieved and errors, such as rotor overshoot and undershoot, are reduced.

In an advantageous embodiment of the invention, wherein the motor is microstepped in accordance with the above-described method, an acceleration value of the stepper motor is a sigmoidal function.

4. BRIEF DESCRIPTION OF THE DRAWINGS

5. DESCRIPTION OF THE PREFERRED EMBODIMENTS

A stator and rotor arrangement of a typical stepper motor employing the microcontrol system of the present invention is described below.

The stators of stepper motors consist of an even number of electromagnets that are formed by energizing internal coils accessible from the motor's control wires. This description shall refer to these electromagnets as teeth or stator teeth. The stator has two sets of teeth. Either two or three wires control each set. We will call one set of wires and teeth phase A and the other set phase B. Current flowing through phase A energizes half of the teeth. Current flowing through phase B energizes the other half of the teeth. The teeth are arranged in a circular pattern such that there is a phase A tooth between each pair of phase B teeth and there is a phase B tooth between each pair of phase A teeth. A tooth that is 180° from another tooth will be controlled by the same phase, but will have the opposite polarity as the other tooth.

The rotors of stepper motors consist of an even number of permanent magnets. Each magnet has a north pole and a south pole which are 180° apart, each pole of each magnet is referred to as a tooth or a rotor tooth. The rotor and its teeth are arranged inside the stator such that the rotor teeth are very close to the stator teeth. The rotor can be spun such that the rotor teeth pass by the stator teeth.

The exact position of a stepper motor is determined by the amount and direction of current flowing through the windings of phase A versus the amount and direction of current flowing through the windings of phase B. If a reasonable current flows through only one winding, the rotor teeth with north polarity will directly align, due to magnetic attraction, with the stator teeth with south polarity, and the rotor teeth with south polarity will directly align with the stator teeth with north polarity. The polarization of the stator teeth is determined by the direction of current flowing through the energized phase. If both phases deliver the same amount of current, the rotor teeth will align half way between the stator teeth. This occurs because there will be adjacent stator teeth at the same polarity and strength to attract rotor teeth which are at the opposite polarity. Any additional current in phase A will cause the rotor teeth to move towards the stator teeth with the stronger polarity. Any additional current in phase B will cause the rotor teeth to move in the opposite direction. It can therefore be reasoned that the exact positioning of a rotor tooth between two stator teeth is determined by the ratio of current flow in the phases. The proper timing of the changes of polarity and amount of current delivered in each phase relative to the other phase is the method used to spin the motor.

A detailed description of the operation of a stepper motor is set forth below.

Figure 1:
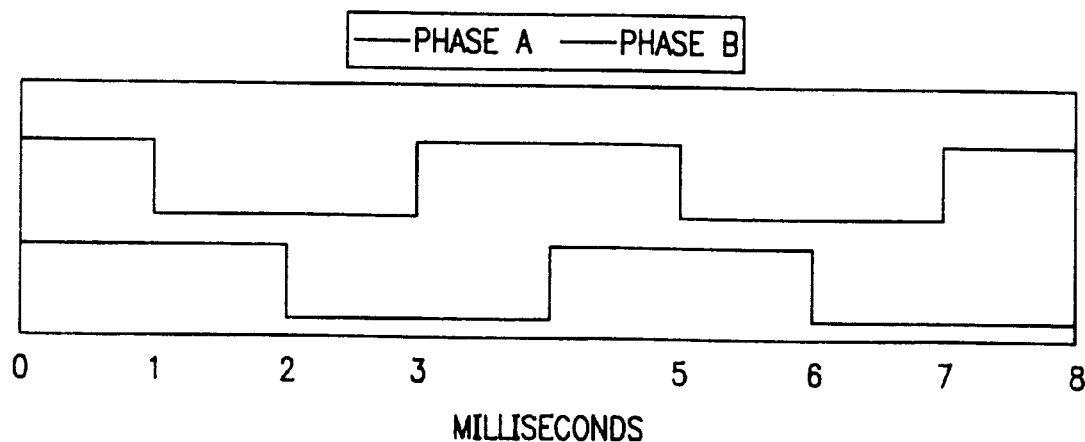
FIGS. 1–10 show sinusoidal current profiles, having increasingly greater number "steps", for driving a stepper motor.

When a stepper motor is driven with the full stepping pattern shown in FIG. 1, each change in drive current causes the teeth of the rotor to align half way between the stator teeth. The two winding drivers are delivering current in square waves with a 90° phase relationship. The amplitude levels of the square waves alternate between the positive and negative RMS levels. Note that the amplitude levels on each phase are always the same, and that the phases are the same polarity half of the time.

Figure 2:
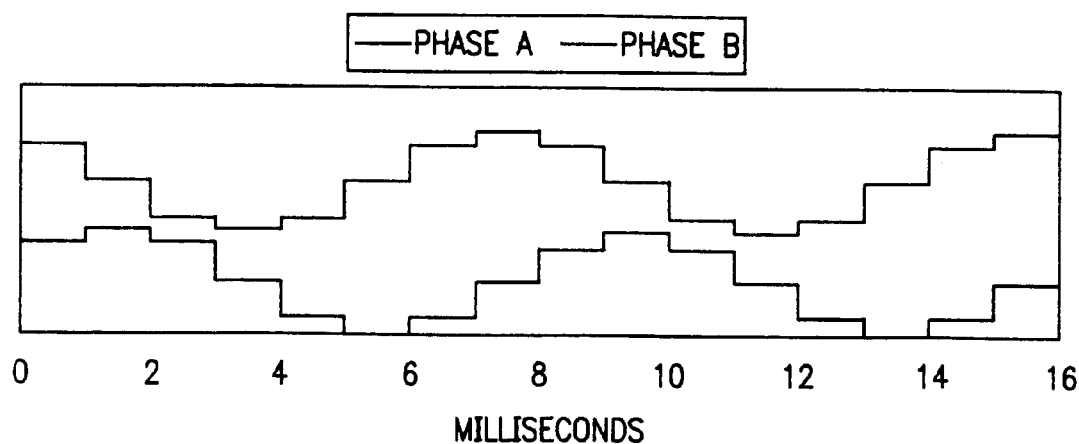

When a stepper motor is driven with the half stepping pattern shown in FIG. 2, each change in drive current causes a repetition of the pattern described in the next sentence. The teeth of the stator and rotor align, then the teeth of the rotor align halfway between the teeth of the stator. Referring to FIG. 2, there are only three levels of current flow, the RMS level, the peak level and zero current. Note that there appear to be more levels because the RMS and peak levels also occur at the opposite polarity and that when either phase is at its RMS level, the other phase is at RMS also. At the RMS time, the rotor teeth will be aligned halfway between the stator teeth. Note also that when either phase is at zero current, the other phase is at peak current. At this time, the rotor and stator teeth will be aligned.

A stepper motor being driven by a signal that is more resolute then a half-stepping signal is considered to be running in micro-stepping mode. This definition includes a sine wave, because a sine wave has infinite resolution. FIGS. 3 through 10 show the various microstepping signals used in a microstepping system. Note that the waveforms are created from a 1024 entry table that contains a half sine wave. The output polarity of the generated half sine wave is changed every second pass through the table, producing alternating current. Stepping through each entry of the table delivers the signal in FIG. 10, stepping through only the 2 RMS values in the table delivers the signal in FIG. 1. Stepping through the table at powers of two between these extremes generates the waveforms between FIGS. 1 and 10. Table resolution is decreased as desired motor speed is increased, therefore, depending on the requested stepper rate, this system varies between full-stepping, half-stepping, and micro-stepping; the reason for this approach is described below.

Figure 7:
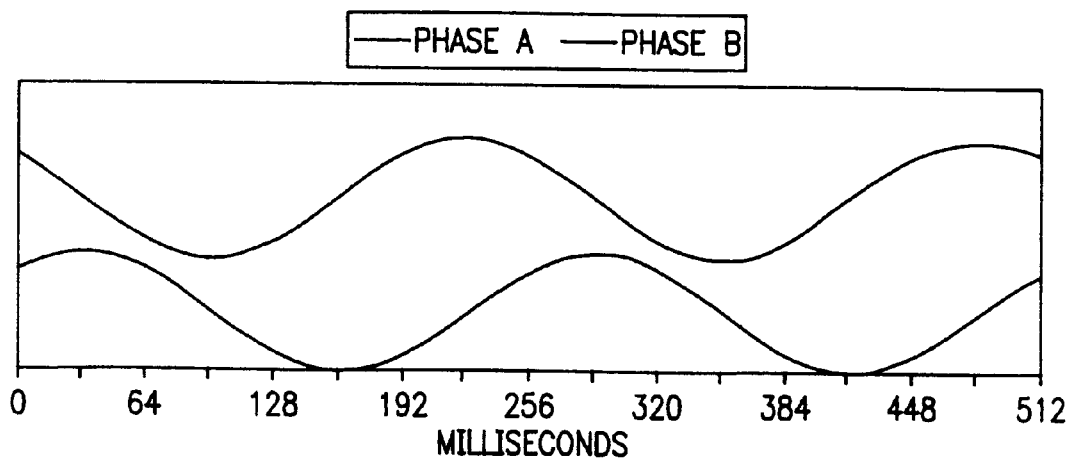
Figure 8:
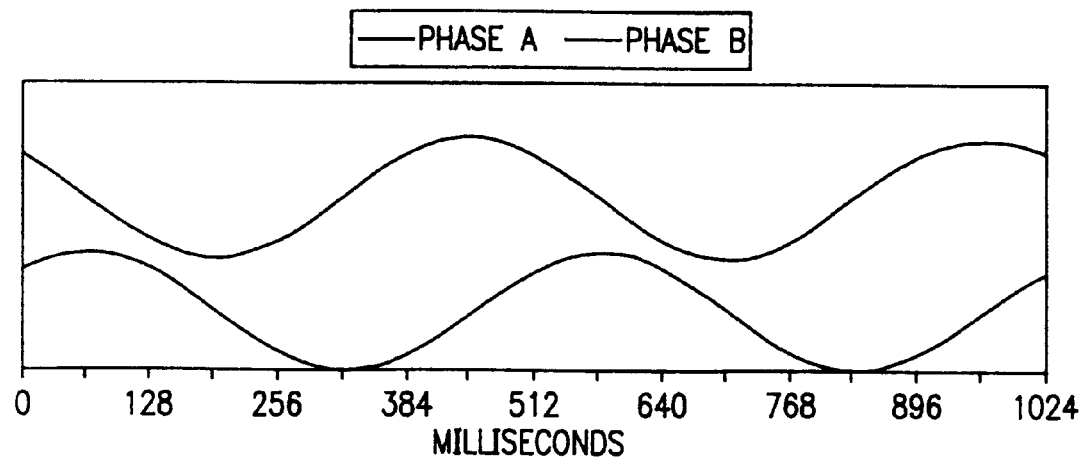
Figure 9:
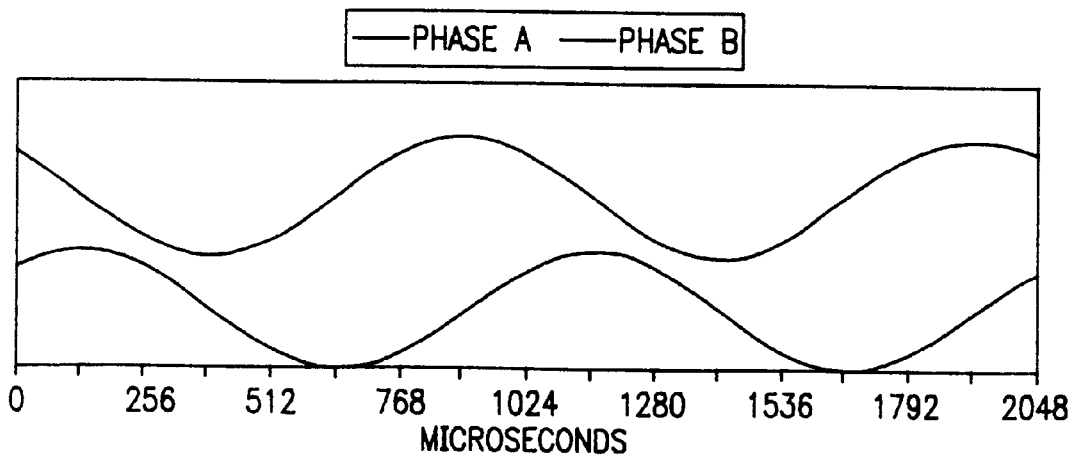
Figure 10:
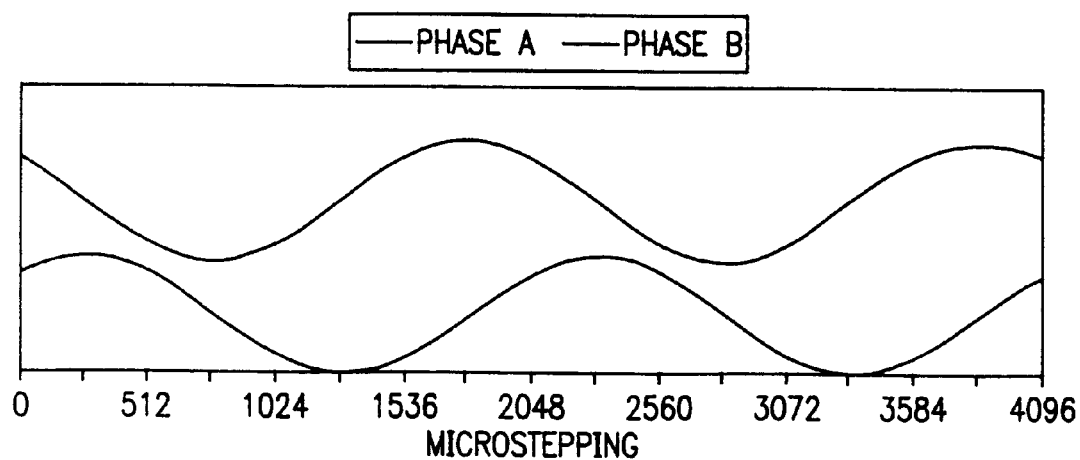

Note that the digital amplitude changes are difficult to see starting at about FIG. 7. This is because the amplitude change of adjacent output levels becomes very small as the table resolution increases. As the drive waveforms move from the square wave in FIG. 1 to the pseudo sine wave in FIG. 10, the mechanical operation becomes smoother. The smoothing effect occurs due to the smaller instantaneous current changes between adjacent output levels. The theoretical response to the digitally generated drive waveform is as follows; the motor moves on an edge and stops on a level. This effect causes mechanical ringing at the transitions between moving and stopping. Because the amount of ringing is directly proportional to the distance moved between steps, the motor runs smoother as the sine wave table resolution increases. The motors are audibly quieter when running in micro-stepping mode.

The reactance of the motor windings and drive circuit has the characteristics of a low pass filter. This reactance reduces mechanical ringing at the higher speeds where half stepping and full stepping are utilized. Note that the waveforms in FIGS. 1 through 10 are the desired current waveforms to the driver circuits and one can only expect these to be the actual current waveforms if the drive voltage is sufficient enough to overcome the winding reactance within the expected time period. The reduction in ringing is apparent when the actual current waveform is observed. The higher frequencies present in the square drive waveform are filtered by the circuit reactance and therefore the coil current appears much more sinusoidal at these higher frequencies than the requested drive does.

A microcontroller drives the stepper motors by writing the sine table's amplitude values to a digital-analog converter DAC that sends its analog output to the stepper motor driver circuits. The microcontroller steps through the table at a rate between 0.9766 milliseconds and 1.952 milliseconds. The interrupt rate will change as the requested speed is varied between the fastest and slowest speeds available in each FIG. 1 through 10. Using FIG. 2 as an example, A rate of 512 steps per second will require an interrupt rate of 0.976 milliseconds and a rate of 257 steps per second will require an interrupt rate of 1.944 milliseconds, rates between these stepper speeds will have proportional interrupt rates. In the example waveforms shown in FIGS. 1 through 10, note that the interrupt rate of all 10 driver signal pairs are 1 millisecond. This produces 1000 steps per second in FIG. 1 and 500 steps per second rate in FIG. 2. This pattern of step rate halving continues all the way to FIG. 10. Faster interrupts require more microcontroller bandwidth, and therefore it is impractical to step at high rates with maximum resolution. For example, an interrupt rate of 954 nanoseconds would be required to step at a rate of 1024 at maximum table resolution. Faster speeds are achieved at the same interrupt rates by reducing the resolution in the amplitude table.

Figure 12A:
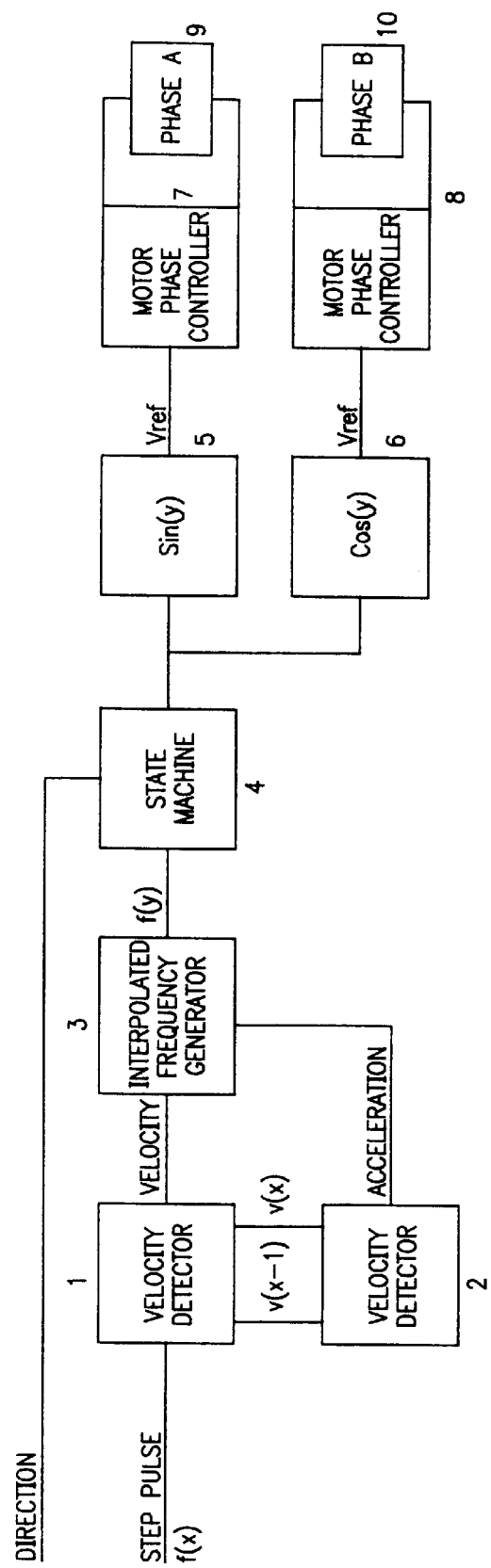
FIGS. 12A and 12B show sample block diagrams of a microstepping controller circuit in accordance with other embodiments of the invention

FIG. 12A is a block diagram of a stepper motor controller according to a preferred embodiment of one of the aspects of the invention. In particular, the motor controller receives a step pulse which includes input frequency f(x), indicative of the commanded steps and input rotational accuracy from a control circuit (not shown). The stepper motor controller includes a velocity detector 1 and an acceleration detector 2 for measuring the velocity and acceleration of f(x). An interpolated frequency generator 3 dynamically interpolates between the start and stop positions of the steps commanded by f(x), using velocity and acceleration measured by the velocity and acceleration detectors, and generates an output frequency f(y). The output step frequency f(y) is higher that the input frequency f(x), and the stepper motor rotational accuracy using frequency f(y) is higher than that indicated by the input frequency f(x). However, the product of the output frequency f(y) and the rotational accuracy using this frequency is not higher than the product of the input frequency f(x) and the input rotational accuracy.

Figure 3:
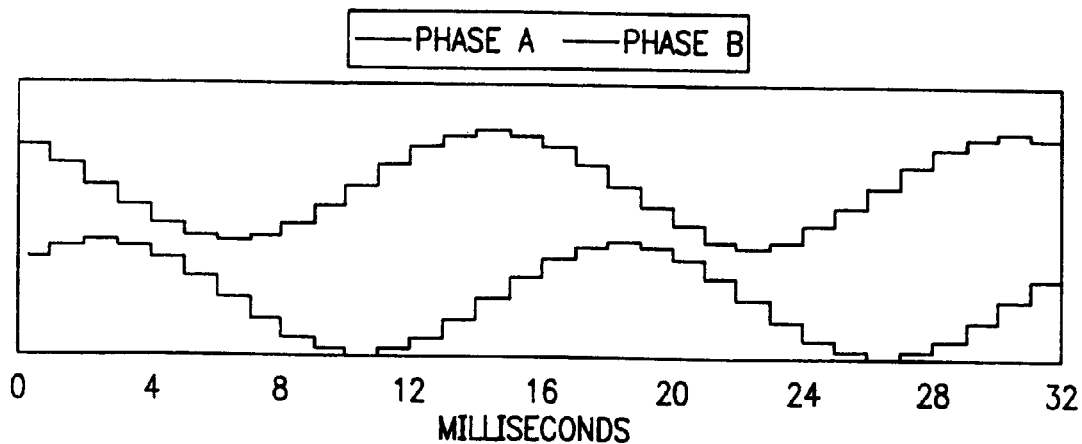
Figure 4:
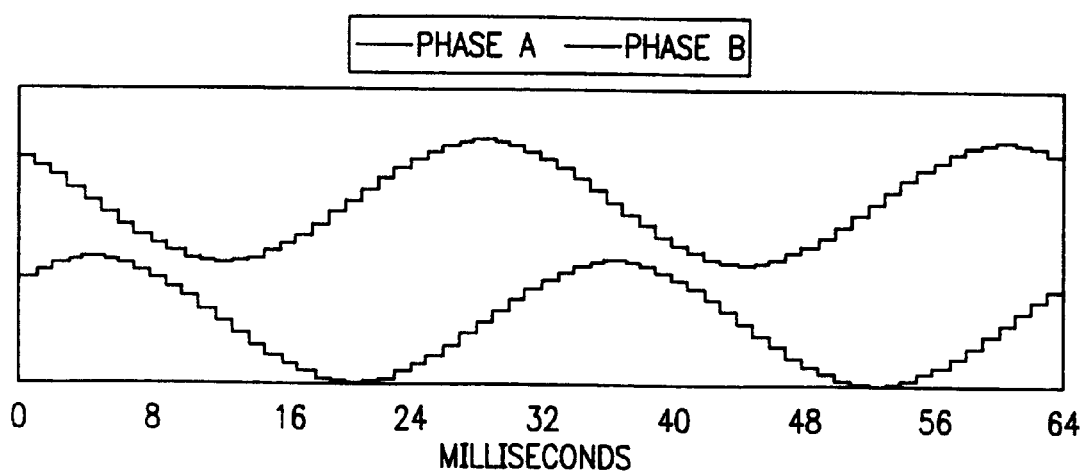
Figure 5:
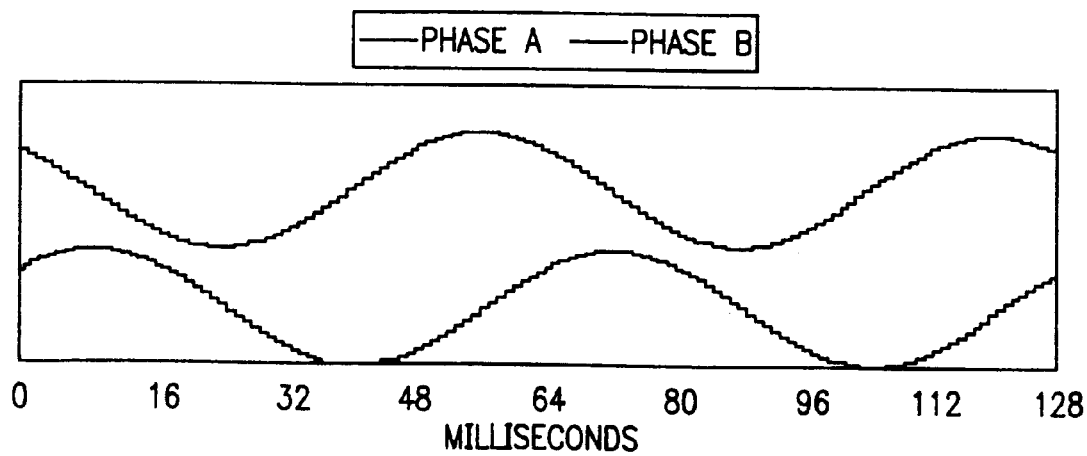
Figure 6:
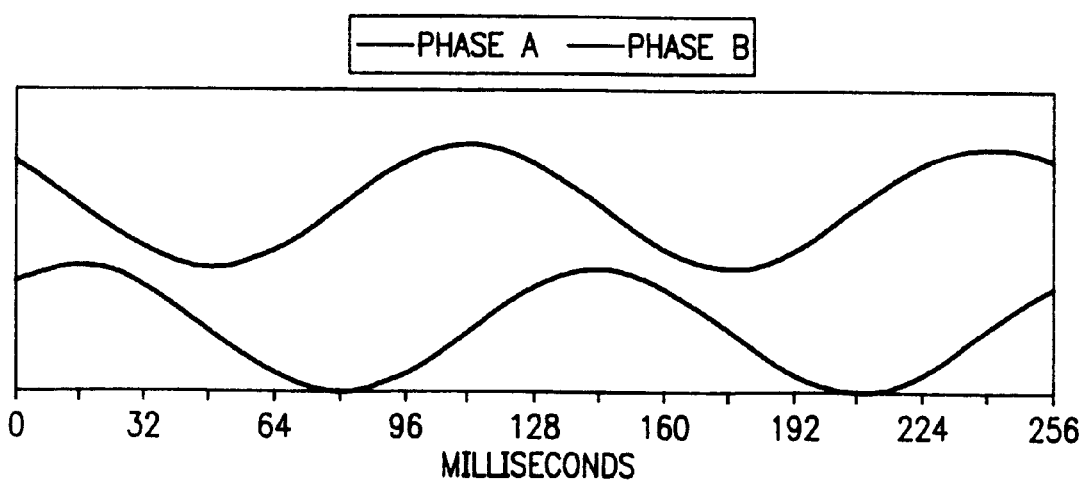

For example, referring to FIGS. 1 and 3, consider a rotational stepper motor having a 100-tooth rotor and a 100-tooth stator, and being capable of a full stepping rate of 1000 full steps per second, as shown in FIG. 1. If this motor is commanded to be full-stepped, then each change in the drive current will cause the teeth of the rotor to align half way between the stator teeth. That is, each such alignment of the rotor will take place in a single full step. Since a fill revolution of a rotational stepper motor is 360°, when the above-described motor is full-stepped, its rotational accuracy is 360° per 100 steps, i.e. 3.6°/step, and the input frequency f(x) is representative of 100 steps per 360°, i.e. 0.2778. In accordance with the invention, increasing the stepper motor accuracy to 0.9°/step would mean calculating an interpolated output frequency f(y) in order to microstep the motor at a rate of 250 full steps per second, as shown in FIG. 3, so that it would take four microsteps before the teeth of the rotor are aligned between successive stator teeth. Accordingly, the output frequency f(y) would be representative of 400 steps per 360°, i.e. 1.1111. Therefore, in accordance with the invention, the product of input frequency f(x) and its associated accuracy, i.e. 0.2778×3.6=1, is equal to the product of the output frequency f(y) and its associated accuracy, i.e. 1.1111×0.9=1. A skilled artisan would appreciate that an analogous example may be applied to describe a linear stepper motor in accordance with the invention.

Figure 13:
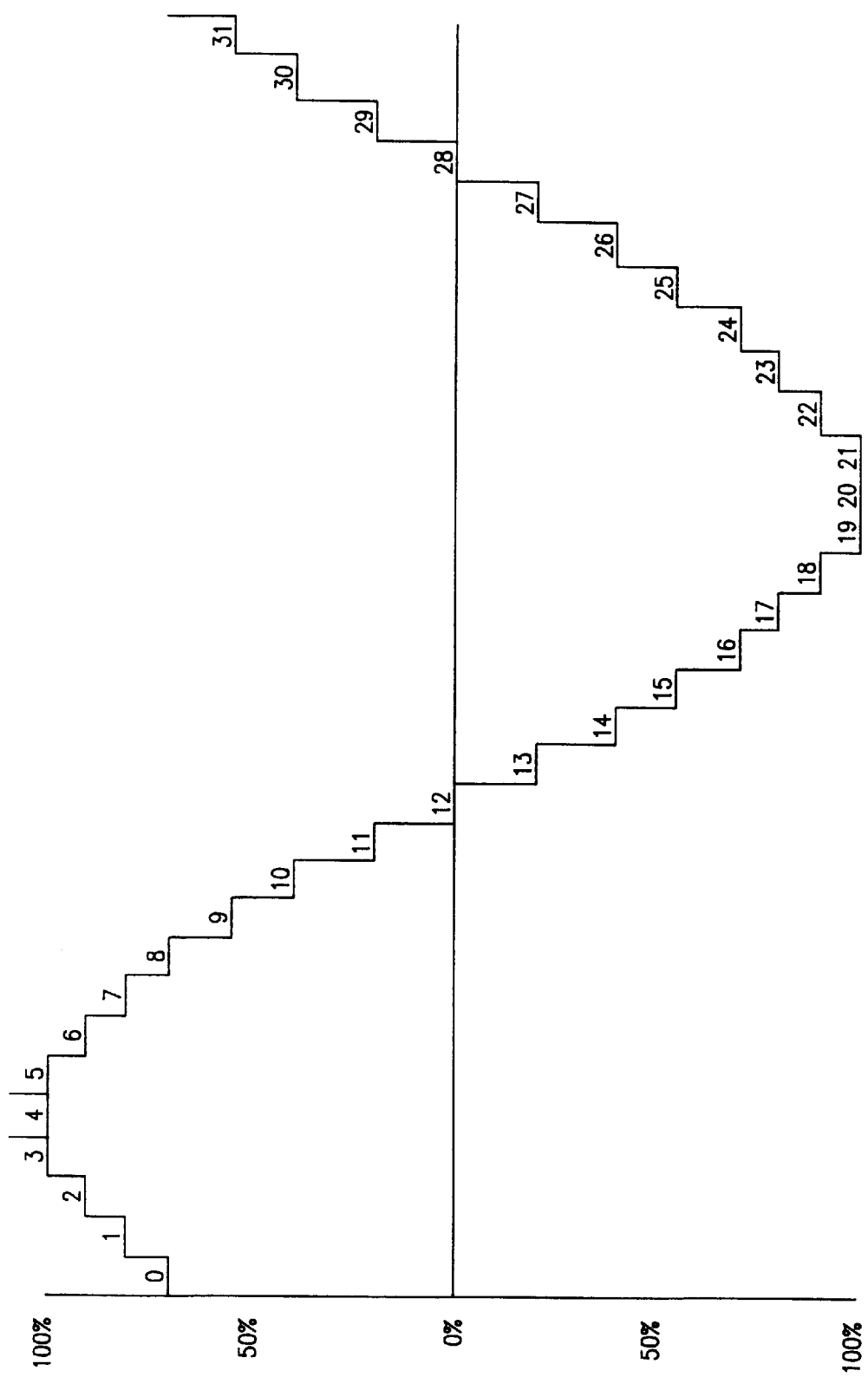
FIG. 13 shows a sine waveform for driving a stepper motor generated according to one of the embodiments of the invention.

The output of the interpolated frequency generator is advantageously processed though a state machine 4 which, based on the desired direction of the stepper motor generates sin(y) and cos(y) waveforms to drive, via motor phase controllers 7 and 8, the independent phases A and B, respectively, of a stepper motor. An example of a sine waveform generated as described above is shown in FIG. 13.

Figure 12B:
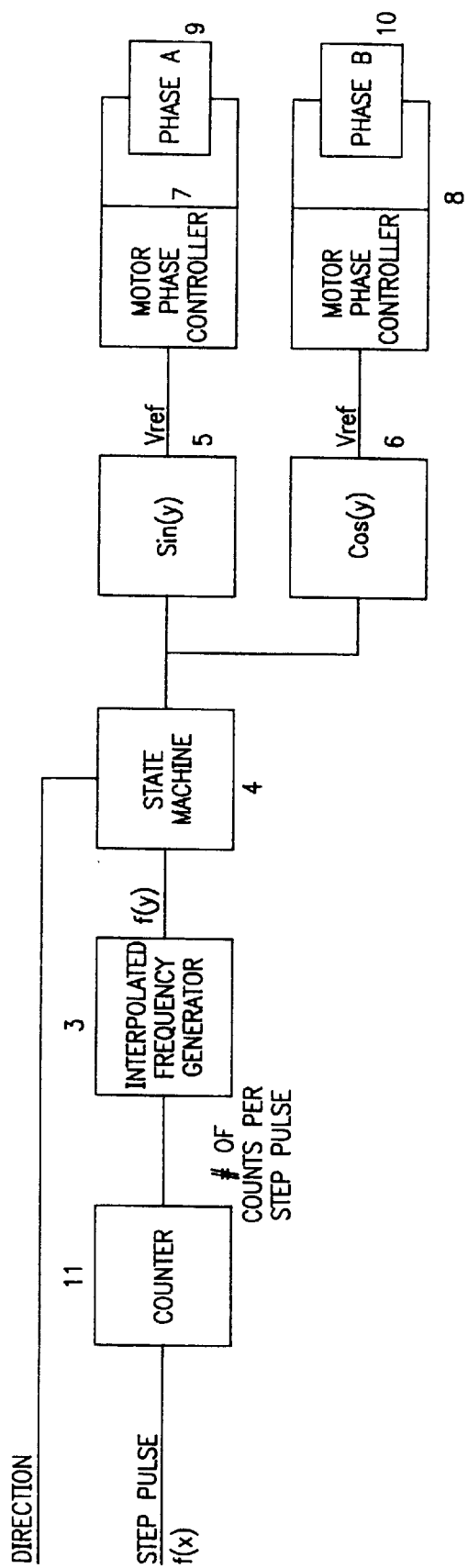

In another embodiment of the microstepper controller according to the present invention, as shown in FIG. 12B, a counter 11 is used to divide the input step pulse into a desired number of small pulses by dynamically interpolating between the commanded steps. In this embodiment, the velocity and acceleration detectors are not necessary since the interpolation criteria is determined in accordance with the desired number of small pulses.

For operation at fixed motor speeds, a motor start command is issued to move at a given speed with no acceleration. In response, the microcontroller sets up a fixed table resolution and a fixed interrupt rate. The stepper motor will move at the resulting rate until a motor stop is requested.

Figure 11:
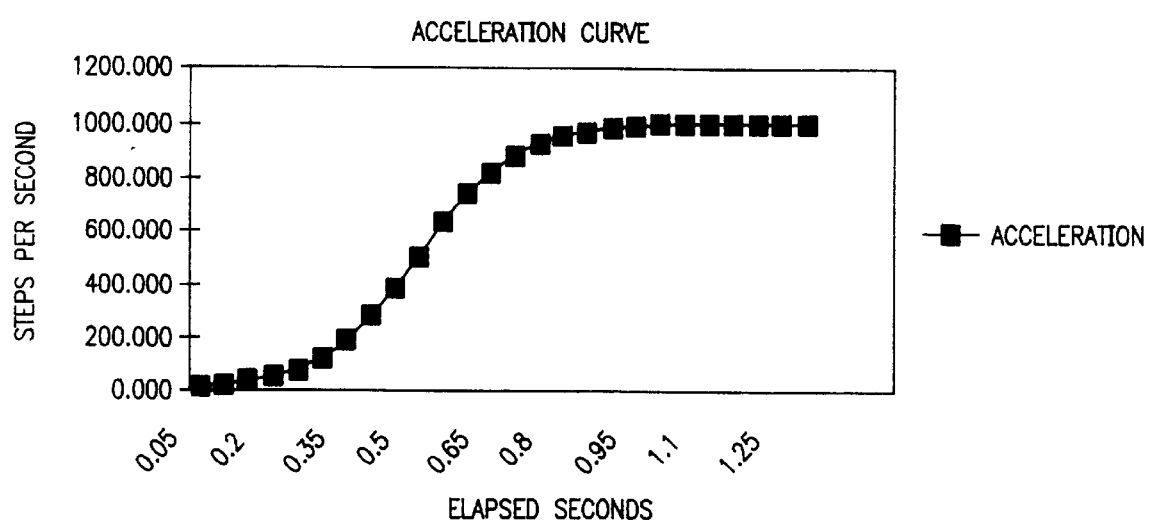
FIG. 11 shows an example of a sigmoidal acceleration curve for an acceleration table for driving a stepper motor in accordance with one of the embodiments of the invention.

The following occurs when the motor is requested to reach a speed via acceleration. The motor start command specifies the final speed in steps per second and an acceleration rate in steps per second per second. For example, a maximum of 10 seconds of acceleration is allowed. This command causes the microcontroller to set up an acceleration table that pairs sine table resolutions with interrupt rates. The slowest step rate in the table is than placed into a memory locations where the stepping interrupt gets its timing and table resolution information. Another interrupt, running every 50 milliseconds is then started to process the acceleration table. New pairs of timing and resolution values are placed in the stepping memory locations at each 50-millisecond interrupt. Each new pair will cause the motor to step faster than the previous pair. The last pair will cause the motor to step as the requested final rate, then the acceleration interrupt will be terminated. In the preferred embodiment, the table values are calculated to form a sigmoid shaped acceleration curve. This curve, an example of which is shown in FIG. 11, has three major features. At the beginning, the curve rises slowly to aid in overcoming load inertia. After this initial slow rise, the curve progresses in a linear fashion until it approaches the final speed. After the linear portion, its acceleration is again slowed down until the final speed is reached; this eliminates the abrupt change from acceleration to no acceleration that occurs in a completely linear acceleration profile. The motor will move at this final speed until a motor stop is requested.

Figure 14:
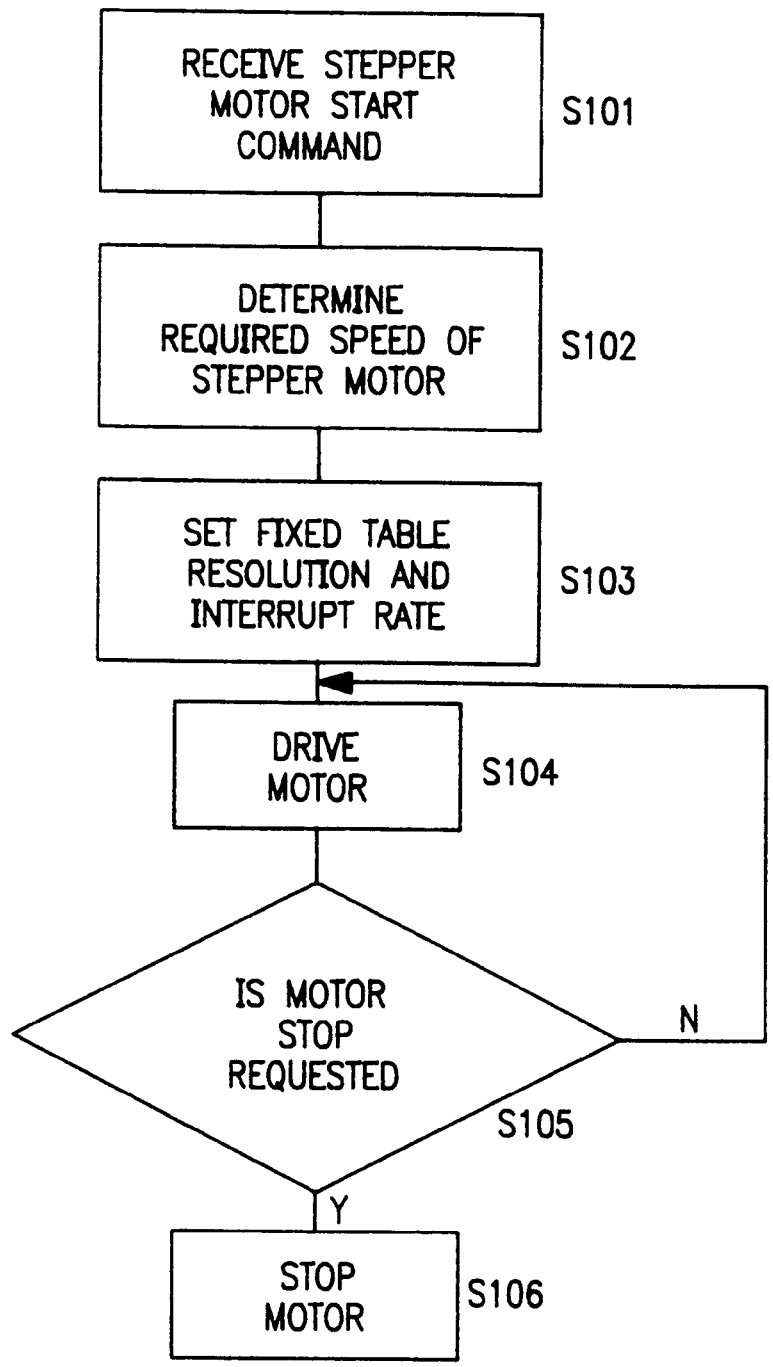
FIGS. 14 and 15 show flowcharts for driving a stepper motor in accordance with the methods of the invention.
Figure 15:
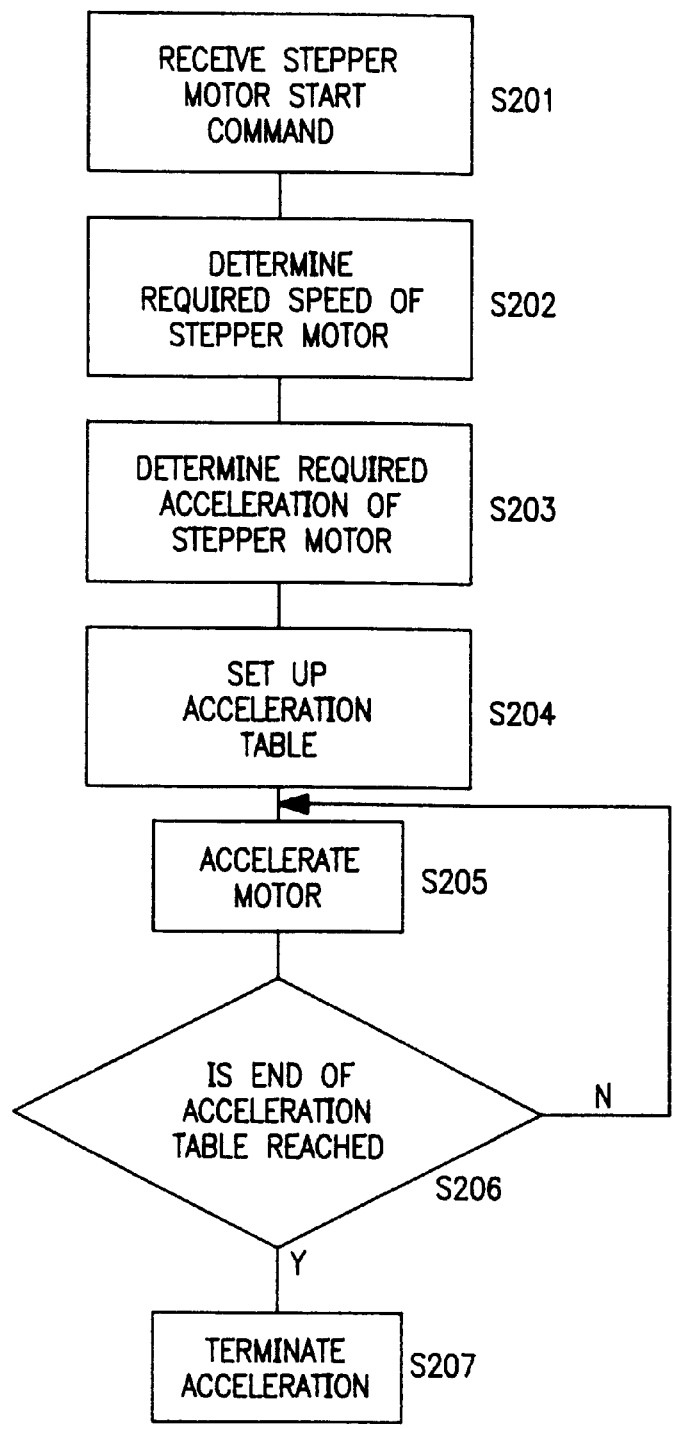

According to another aspect of the invention, a method for microstepping a stepper motor, which overcomes the drawbacks noted in the Background section, includes the steps shown in FIG. 14 for fixed motor speed operation, and in FIG. 15 for motor operation that includes acceleration.

Referring to FIG. 14, in step S101, a motor start command is received. In step S102, the required speed of the stepper motor is determined. In step S103, based on the required speed, a fixed table resolution and a corresponding fixed interrupt rate for driving the stepper motor are set. Accordingly, the motor is driven, step S104, at the required speed until a motor stop command is detected in step S105.

Referring to FIG. 15, in step S201, a motor start command is received. In step S202, the required speed of the stepper motor is determined. In step S203, the acceleration to reach the required speed is determined. In step S204, an acceleration table that pairs sine table resolutions with interrupt rates is set up. In the preferred embodiment, the acceleration table values are calculated to form a sigmoidal shaped acceleration curve. In steps S205, the stepper motor is driven with reference to the acceleration table such that each new pair of timing and resolution values will cause the motor to step faster than the previous pair. The acceleration interrupt is terminated in step S207 upon detection of the end of the acceleration table in step S206. Upon termination of acceleration, the stepper motor is driven at the required speed as indicated in steps S104–S106, described above, with the last pair of values in the acceleration table causing the motor to step at the required speed.

The micro-stepping method described above delivers a notable improvement in stepper motor system resonance without additional bandwidth requirements to the microcontroller because the bandwidth is already required to run the fastest rate used in full-step operation.

The stepper motor controller and method of the present invention are useful wherever stepper motors are employed. A particular use, in accordance with a preferred embodiment of this invention, is in blood processing equipment. U.S. Pat. No. 5,603,845, incorporated herein by reference, discloses an apparatus for processing blood. The apparatus employs a phase separation container, which comprises a cylindrical container body having a piston defining first and second chambers therein. A syringe body is located within the shaft of the piston and is in fluid communication with the second chamber. The apparatus includes a motor means for centrifugally rotating the phase separation container about its longitudinal axis, locking means for holding the container in place (as further described in W097/20635 also incorporated herein by reference), and means for actuating the piston and syringe. Blood can be placed into the first chamber and separated into a red blood cell portion and a plasma portion by centrifugal force. Movement of the piston can transfer the plasma to the second chamber where it is reacted with a first reagent provided by a further piston movement as fully described in U.S. Pat. No. 5,830,352 (CV0204a) incorporated herein by reference. Actuation of the syringe introduces a second reagent into the second chamber and the empty syringe can thereafter be used to collect the desired plasma product after it travels by centrifugal force through an annular filter in the phase separation container as further described in U.S. Pat. No. 5,795,489 (CV0205a) incorporated herein by reference. U.S. Pat. No. 5,824,230 further describes the details of this process.

In such an apparatus as described above, stepper motors are employed to move the piston up and down, actuate the syringe and engage the locking mechanisms to hold the phase separation container in place for high speed centrifugation. This is a precise sensor-controlled process, which can be disturbed by the vibrational resonance, which accompanies prior art stepper motor usage. In order to insure that the process is not adversely effected and the blood is not wasted, it is important to reduce the vibration and background noise as much as possible. Given the complex microprocessor control system with in-line sensors employed (e.g., sensors for red blood cells, fibrin concentration and temperature as described respectively in U.S. Pat. No. 5,849,178, WO 98/30887 and WO 98/30304), it is also important to do this using minimal overhead. Thus, the stepper motor controller and methods of the present invention are ideally suited for the blood processing apparatus as described above, and such use is in accordance with preferred embodiments of this invention.

It will be understood by those skilled in the art that the above described method (as illustrated, for example in FIGS. 13 and 14) and apparatus (as illustrated in FIGS. 12A and 12B) may be implemented independently, or together, to achieve smooth microstepping operation of a stepper motor with low overhead. Likewise, changes and modifications in the above described embodiments of the invention can be implemented without departing from the scope thereof. For example, the above described embodiments may be implemented with linear, as swell as rotational, stepper motors. Accordingly, the scope of the invention is intended to be limited by the scope of the appended claims.

We claim:

1. A stepper motor controller, for microstepping the stepper motor, which receives an input frequency indicative of commanded steps, each of said commanded steps having a start and stop positions, and indicative of a first rotational accuracy of said stepper motor, comprising:

a counter which divides said each of said commanded steps into a number of counts; and an interpolated frequency generator which dynamically interpolates between said start and said stop positions based on said number of counts, thereby generating an output frequency for microstepping said stepper motor such that said stepper motor microsteps at a second rotational accuracy, wherein said output frequency is higher than said input frequency, and the product of said output frequency and said second rotational accuracy is not higher than the product of said input frequency and said first rotational accuracy.

2. The stepper motor controller as claimed in claim 1, further comprising:

a first phase which includes a first set of electromagnets of a stator of said stepper motor;

a second phase which includes a second set of electromagnets of said stator; and a sine waveform generator which generates a sine waveform based on said output frequency, wherein each electromagnet of said first set of electromagnets is positioned between at least two electromagnets of said second set of electromagnets, and said first and second phases are driven using said sine waveform.

3. A stepper motor controller, for microstepping the stepper motor, which receives an input frequency indicative of commanded steps, each of said commanded steps having a start and stop positions, and indicative of a first rotational accuracy of said stepper motor, comprising:

a velocity detector for detecting a velocity of said stepper motor based on said input frequency;

an acceleration detector for detecting an acceleration of said stepper motor based on said input frequency; and an interpolated frequency generator which dynamically interpolates between the commanded steps based on said velocity and said acceleration, to thereby generate an output frequency for microstepping said stepper motor such that said stepper motor microsteps at said second rotational accuracy, wherein said output frequency is higher than said input frequency, and the product of said output frequency and said second rotational accuracy is not higher than the product of said input frequency and said first rotational accuracy.

4. The stepper motor controller as claimed in claim 3, further comprising:

a first phase which includes a first set of electromagnets of a stator of said stepper motor;

a second phase which includes a second set of electromagnets of said stator; and a sine waveform generator which generates a sine waveform based on said output frequency, wherein each electromagnet of said first set of electromagnets is positioned between at least two electromagnets of said second set of electromagnets, and said first and second phases are driven using said sine waveform.

5. A stepper motor controller, for microstepping the stepper motor, which receives an input frequency indicative of commanded steps, each of said commanded steps having a start and stop positions, and indicative of a first linear accuracy of said stepper motor, comprising:

a counter which divides said each of said commanded steps into a number of counts; and an interpolated frequency generator which dynamically interpolates between said start and said stop positions based on said number of counts, thereby generating an output frequency for microstepping said stepper motor such that said stepper motor microsteps at a second linear accuracy, wherein said output frequency is higher than said input frequency, and the product of said output frequency and said second linear accuracy is not higher than the product of said input frequency and said first linear accuracy.

6. The stepper motor controller as claimed in claim 5, further comprising:

a first phase which includes a first set of electromagnets of a stator of said stepper motor;

a second phase which includes a second set of electromagnets of said stator; and a sine waveform generator which generates a sine waveform based on said output frequency, wherein each electromagnet of said first set of electromagnets is positioned between at least two electromagnets of said second set of electromagnets, and said first and second phases are driven using said sine waveform.

7. A stepper motor controller, for microstepping the stepper motor, which receives an input frequency indicative of commanded steps, each of said commanded steps having a start and stop positions, and indicative of a first linear accuracy of said stepper motor, comprising:

a velocity detector for detecting a velocity of said stepper motor based on said input frequency;

an acceleration detector for detecting an acceleration of said stepper motor based on said input frequency; and an interpolated frequency generator which dynamically interpolates between the commanded steps based on said velocity and said acceleration, to thereby generate an output frequency for microstepping said stepper motor such that said stepper motor microsteps at said second linear accuracy, wherein said output frequency is higher than said input frequency, and the product of said output frequency and said second linear accuracy is not higher than the product of said input frequency and said first linear accuracy.

8. The stepper motor controller as claimed in claim 7, further comprising:

a first phase which includes a first set of electromagnets of a stator of said stepper motor;

a second phase which includes a second set of electromagnets of said stator; and a sine waveform generator which generates a sine waveform based on said output frequency, wherein each electromagnet of said first set of electromagnets is positioned between at least two electromagnets of said second set of electromagnets, and said first and second phases are driven using said sine waveform.

9. A method for microstepping a stepper motor comprising the steps of:

receiving a motor command, said command including one of a start command and a stop command;

determining a required speed of the stepper motor based on information in said start command;

setting a fixed sine table resolution and a corresponding fixed interrupt rate for microstepping said stepper;

determining if a motor stop command has been detected; and microstepping said stepper motor, with reference to said fixed sine table and said fixed interrupt rate, at said required speed until said motor stop command is detected.

10. The method for microstepping a stepper motor according to claim 9, wherein said fixed interrupt rate is determined by an amount of overhead associated with a microcontroller for microstepping said stepping motor.

11. A method for microstepping a stepper motor comprising the steps of:

receiving a motor start command;

determining a required speed of the stepper motor based on information in said start command;

determining an acceleration to reach said required constant speed based on said information included with said start command;

setting an acceleration table that pairs sine table resolutions with interrupt rates such that values of each successive pair of said resolutions and said interrupt rates causes said stepper motor to step at a faster rate;

microstepping said stepper motor with reference to said acceleration table;

detecting an end of said acceleration table; and microstepping said stepper motor at said required constant speed with reference to a last pair of said pairs of said resolutions and said interrupt rates set up in said acceleration table.

12. The method for microstepping a stepper motor according to claim 11, wherein said acceleration table values are calculated to form a sigmoidal shaped acceleration curve.

* * * * *